United States Patent
Bruno et al.

(10) Patent No.: US 11,136,130 B2
(45) Date of Patent: Oct. 5, 2021

(54) AIRCRAFT ENVIROMENTAL CONTROL SYSTEM WITH SERIES BLEED AIR TURBINES

(71) Applicant: Hamilton Sundstrand Corporation, Charlotte, NC (US)

(72) Inventors: Louis J. Bruno, Ellington, CT (US); Christina W. Millot, Wilbraham, MA (US); Thomas M. Zywiak, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 388 days.

(21) Appl. No.: 15/987,651

(22) Filed: May 23, 2018

(65) Prior Publication Data

US 2019/0135440 A1    May 9, 2019

Related U.S. Application Data

(60) Provisional application No. 62/581,959, filed on Nov. 6, 2017.

(51) Int. Cl.
*B64D 13/06*      (2006.01)
*F25B 9/00*      (2006.01)

(52) U.S. Cl.
CPC ...... *B64D 13/06* (2013.01); *B64D 2013/0618* (2013.01); *B64D 2013/0648* (2013.01);
(Continued)

(58) Field of Classification Search
CPC ..................................................... B64D 13/06
See application file for complete search history.

(56) References Cited

U.S. PATENT DOCUMENTS

| | | | | |
|---|---|---|---|---|
| 5,299,763 A | * | 4/1994 | Bescoby | ............... B64D 13/06 244/118.5 |
| 5,461,882 A | * | 10/1995 | Zywiak | ............. B60H 1/00007 62/401 |

(Continued)

FOREIGN PATENT DOCUMENTS

| | | |
|---|---|---|
| EP | 1112930 A2 | 7/2001 |
| EP | 1176090 A1 | 1/2002 |

(Continued)

OTHER PUBLICATIONS

Partial European Search Report: International Application No. 18204552.6-1010; International Filing Date: Nov. 2018; dated Apr. 3, 2019; 18 pages.

*Primary Examiner* — Michael H Wang
(74) *Attorney, Agent, or Firm* — Cantor Colburn LLP

(57) ABSTRACT

An environmental control system of an aircraft includes a ram air circuit including a ram air shell having at least one heat exchanger positioned therein, at least one dehumidification system arranged in fluid communication with the ram air circuit, a compressing device arranged in fluid communication with the ram air circuit and the dehumidification system, and an expansion device separate from the compressing device and arranged in fluid communication with the ram air circuit and the at least one dehumidification system. The environmental control system receives a flow of a first medium and a flow of a second medium. The environmental control system is operable in a plurality of modes and in a first mode, a flow of the first medium is provided to the compressing device and the expansion device in series.

13 Claims, 4 Drawing Sheets

(52) U.S. Cl.
CPC ............... *B64D 2013/0662* (2013.01); *B64D 2013/0688* (2013.01); *F25B 9/004* (2013.01)

(56) References Cited

U.S. PATENT DOCUMENTS

| | | | |
|---|---|---|---|
| 6,505,474 B2 | 1/2003 | Sauterleute et al. | |
| 6,595,010 B2* | 7/2003 | Sauterleute | B01D 45/08 |
| | | | 62/401 |
| 7,222,499 B2* | 5/2007 | Hunt | B64D 13/06 |
| | | | 62/402 |
| 9,211,954 B2* | 12/2015 | Barkowsky | B64D 13/06 |
| 9,657,648 B2* | 5/2017 | Bruno | F02C 3/04 |
| 9,669,936 B1* | 6/2017 | Fiterman | B64D 13/06 |
| 2013/0118191 A1* | 5/2013 | Zywiak | B64D 13/06 |
| | | | 62/87 |
| 2016/0083100 A1* | 3/2016 | Bammann | B64D 13/06 |
| | | | 62/89 |
| 2016/0114894 A1* | 4/2016 | Schwarz | F02C 3/107 |
| | | | 60/783 |
| 2016/0272329 A1* | 9/2016 | Beers | B64D 13/06 |
| 2017/0160180 A1* | 6/2017 | Bezold | B64D 13/02 |
| 2017/0174357 A1* | 6/2017 | Ramos-Paul Lastra | |
| | | | B64D 13/06 |
| 2017/0275004 A1* | 9/2017 | Bammann | F25B 49/02 |
| 2017/0305556 A1 | 10/2017 | Bruno | |
| 2017/0341757 A1* | 11/2017 | Weber | F25B 9/004 |
| 2017/0341767 A1* | 11/2017 | Bruno | F01D 17/105 |

FOREIGN PATENT DOCUMENTS

| | | |
|---|---|---|
| EP | 1386837 A1 | 2/2004 |
| EP | 2998224 A1 | 3/2016 |

* cited by examiner

AIRCRAFT ENVIROMENTAL CONTROL SYSTEM WITH SERIES BLEED AIR TURBINES

CROSS-REFERENCE TO RELATED APPLICATIONS

This application claims benefit of priority to U.S. Provisional Application No. 62/581,959, filed Nov. 6, 2017, the disclosure of which is incorporated herein by reference in its entirety.

BACKGROUND

Embodiments of the disclosure relate to environmental control systems, and more specifically to an environmental control system of an aircraft.

Aircraft need to have their internal environment controlled. In general, contemporary air conditioning systems are supplied a pressure at cruise that is approximately 30 psig to 35 psig. The trend in the aerospace industry today is towards systems with higher efficiency. One approach to improve efficiency of an aircraft environmental control system is to eliminate the bleed air entirely and use electrical power to compress outside air. A second approach is to use lower engine pressure. The third approach is to use the energy in the cabin outflow air to compress outside air and bring it into the cabin. Each of these approaches provides a reduction in airplane fuel burn.

SUMMARY

According to an embodiment, an environmental control system of an aircraft includes a ram air circuit including a ram air shell having at least one heat exchanger positioned therein, at least one dehumidification system arranged in fluid communication with the ram air circuit, a compressing device arranged in fluid communication with the ram air circuit and the dehumidification system, and an expansion device separate from the compressing device and arranged in fluid communication with the ram air circuit and the at least one dehumidification system. The environmental control system receives a flow of a first medium and a flow of a second medium. The environmental control system is operable in a plurality of modes and in a first mode, a flow of the first medium is provided to the compressing device and the expansion device in series.

In addition to one or more of the features described above, or as an alternative, in further embodiments the compressing device includes a first shaft, and the expansion device includes a second shaft, the first shaft being distinct from the second shaft.

In addition to one or more of the features described above, or as an alternative, in further embodiments the environmental control system is operable in the first mode when the aircraft is on the ground.

In addition to one or more of the features described above, or as an alternative, in further embodiments in a second mode, the flow of the first medium output from the expansion device is provided to a compressor of compressing device.

In addition to one or more of the features described above, or as an alternative, in further embodiments in a third mode, the flow of the first medium bypasses the expansion device.

In addition to one or more of the features described above, or as an alternative, in further embodiments the environmental control system is operable in the third mode when the aircraft is in flight.

In addition to one or more of the features described above, or as an alternative, in further embodiments in a fourth mode, the flow of the first medium bypasses the expansion device and is released into the ram air circuit.

In addition to one or more of the features described above, or as an alternative, in further embodiments when the environmental control system is in the fourth mode, only the second medium is provided to a volume of the aircraft.

In addition to one or more of the features described above, or as an alternative, in further embodiments the expansion device is a simple cycle expansion device.

In addition to one or more of the features described above, or as an alternative, in further embodiments the expansion device is operable to draw ram air through the ram air circuit.

In addition to one or more of the features described above, or as an alternative, in further embodiments the compression device further includes: a turbine configured to provide energy by expanding a first medium and a compressor configured to receive energy from the first medium being expanded across the turbine, the compressor being configured to compress the second medium.

In addition to one or more of the features described above, or as an alternative, in further embodiments the first medium is bleed air.

In addition to one or more of the features described above, or as an alternative, in further embodiments the bleed air is drawn from at least one of an engine and an auxiliary power unit.

In addition to one or more of the features described above, or as an alternative, in further embodiments the second medium is fresh air.

In addition to one or more of the features described above, or as an alternative, in further embodiments the compression device further includes a power turbine configured to provide energy to the compressor by expanding a third medium.

According to another embodiment, an environmental control system of an aircraft includes a ram air circuit including a ram air shell having at least one heat exchanger positioned therein, at least one dehumidification system arranged in fluid communication with the ram air circuit, a compressing device arranged in fluid communication with the ram air circuit and the dehumidification system and an expansion device separate from the compressing device and arranged in fluid communication with the ram air circuit and the at least one dehumidification system. The environmental control system receives at least one flow of a medium, The at least one dehumidification system is configured to remove moisture from the flow of medium when the medium is at a temperature above freezing.

In addition to one or more of the features described above, or as an alternative, in further embodiments the at least one dehumidification system includes a condenser and a water extractor, and moisture is removed from the flow of medium in the condenser.

In addition to one or more of the features described above, or as an alternative, in further embodiments the temperature of the medium is between 40° C. and 50° C.

In addition to one or more of the features described above, or as an alternative, in further embodiments the flow of medium is a fresh air.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Embodiments herein provide an environmental control system of an aircraft that mixes mediums from different sources and uses energy from one or more of the different sources to power the environmental control system and to provide cabin pressurization and cooling at a high fuel burn efficiency. The mediums described herein are generally types of air; however, it should be understood that other mediums, such as gases, liquids, fluidized solids, or slurries are also contemplated herein.

Figure 1:
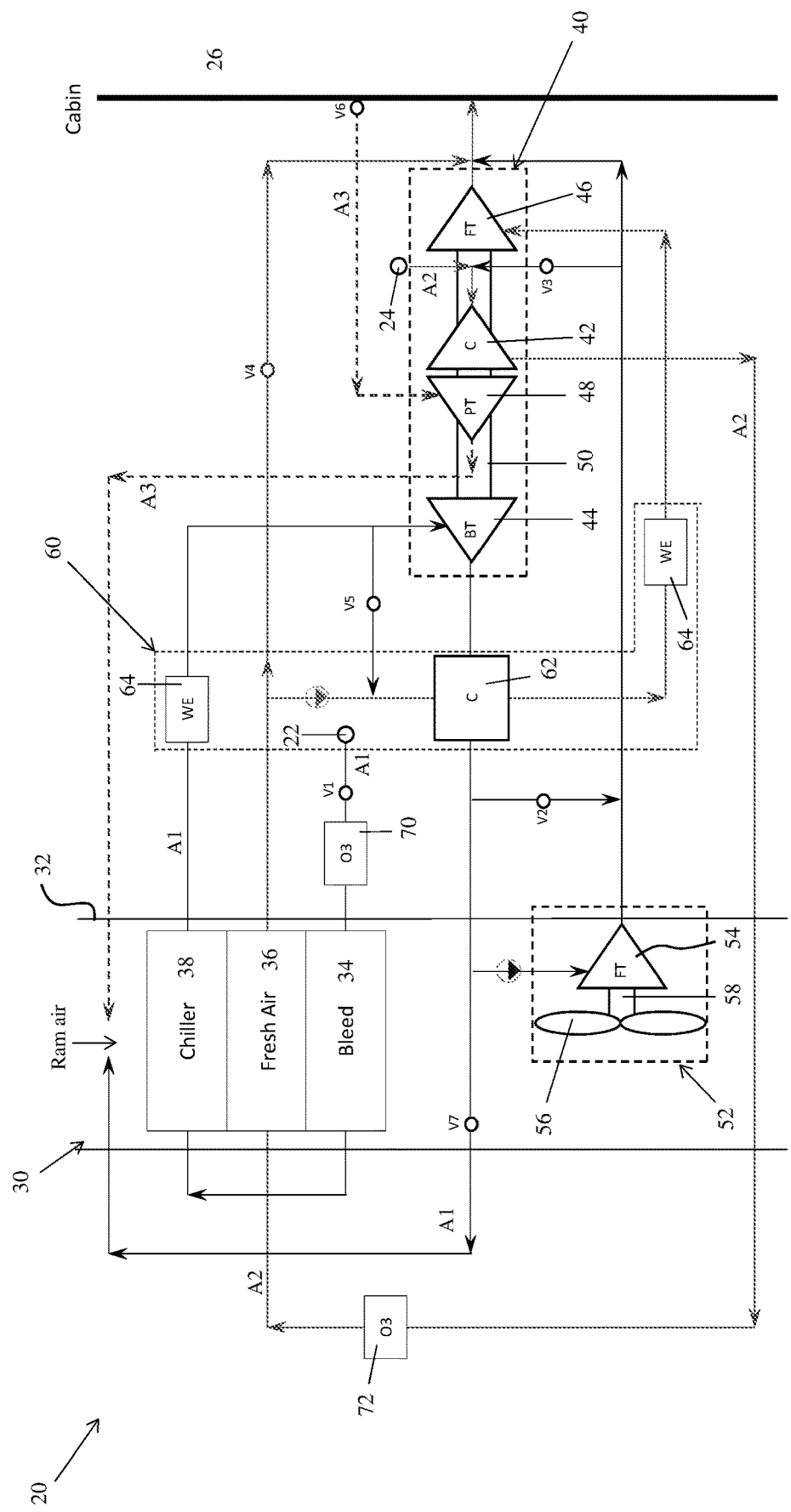
FIG. 1 is a simplified schematic diagram of a portion of an environmental control system according to an embodiment.

With reference now to FIG. 1, a schematic diagram of a portion of an environment control system (ECS) 20, such as a pack for example, is depicted according to non-limiting embodiments. Although the environmental control system 20 is described with reference to an aircraft, alternative applications are also within the scope of the disclosure. As shown in the FIG., the system 20 can receive a first medium A1 at a first inlet 22. In embodiments where the environmental control system 20 is used in an aircraft application, the first medium A1 is bleed air, which is pressurized air originating from i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

The system 20 also receives a second medium A2 at an inlet 24 and may provide a conditioned form of at least one of the first medium A1 and the second medium A2 to a volume 26. In an embodiment, the second medium A2 is fresh air, such as outside air for example. The outside air can be procured via one or more scooping mechanisms, such as an impact scoop or a flush scoop for example. Thus, the inlet 24 can be considered a fresh or outside air inlet. Generally, the fresh air A2 described herein is at an ambient pressure equal to an air pressure outside of the aircraft when the aircraft is on the ground, and is between an ambient pressure and a cabin pressure when the aircraft is in flight.

The system 20 can further receive a third medium A3 from the volume 26. In one embodiment, the volume 26 is the cabin of an aircraft and the third medium A3 is cabin discharge air, which is air leaving the volume 26 that would typically be discharged overboard. In some embodiments, the system 20 is configured to extract work from the third medium A3. In this manner, the pressurized air A3 of the volume 26 can be utilized by the system 20 to achieve certain operations.

The environmental control system 20 includes a RAM air circuit 30 including a shell or duct, illustrated schematically at 32, within which one or more heat exchangers are located. The shell 32 can receive and direct a medium, such as ram air for example, through a portion of the system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a first heat exchanger 34, a second heat exchanger 36, and a third heat exchanger 38. Within the heat exchangers 34, 36, 38, ram air, such as outside air for example, acts as a heat sink to cool a medium passing there through, for example the first medium A1 and/or the second medium A2.

The system 20 additionally comprises at least one compression device 40. In the illustrated, non-limiting embodiment, the compression device 40 of the system 20 is a mechanical device that includes components for performing thermodynamic work on a medium (e.g., extracts work from or applies work to the first medium A1, the second medium A2, and/or the third medium A3 by raising and/or lowering pressure and by raising and/or lowering temperature). Examples of the compression device 40 include an air cycle machine, a three-wheel air cycle machine, a four-wheel air cycle machine, etc.

As shown, the compression device 40 includes a compressor 42, a bleed air turbine 44, a fresh air turbine 46, and a power turbine 48 operably coupled to each other via a shaft 50. The compressor 42 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the second medium A2. The bleed air turbine 44, the fresh air turbine 46, and the power turbine 48 are mechanical devices that expand a medium and extract work therefrom (also referred to as extracting energy). In the compression device 40, the turbines 44, 46, and 48 drive the compressor 42 via the shaft 50.

The system 20 additionally comprises at least one expansion device 52. The expansion device 52 is a mechanical device, similar to the compression device 40, and includes components for performing thermodynamic work on a medium (e.g., extracts work from or applies work to the first medium A1 by raising and/or lowering pressure and by raising and/or lowering temperature). Examples of the expansion device 52 include, but are not limited to, a simple air cycle machine or a tip turbine fan etc.

In the illustrated, non-limiting embodiment, the expansion device 52 is a two-wheel air cycle machine including a turbine 54 and a fan 56 operably coupled via a shaft 58. However, it should be understood that any suitable expansion device, including an air cycle machine having any number of wheels (i.e. three-wheel or four-wheel) are also within the scope of the disclosure. The turbine 54 is a mechanical device that expands a medium and extracts work therefrom. In the expansion device 52, the turbine 54 drives rotation of the fan 56 via the shaft 58. In a non-limiting embodiment, the turbine 54 can comprise a nozzle configured to accelerate a medium supplied thereto for entry into a turbine impeller (not shown). The fan 56 is a mechanical device that can force via push or pull methods a medium (e.g., ram air) through the shell 32 across the one or more ram heat exchangers 34, 36, 38 and at a variable cooling to control temperatures.

Figure 2:
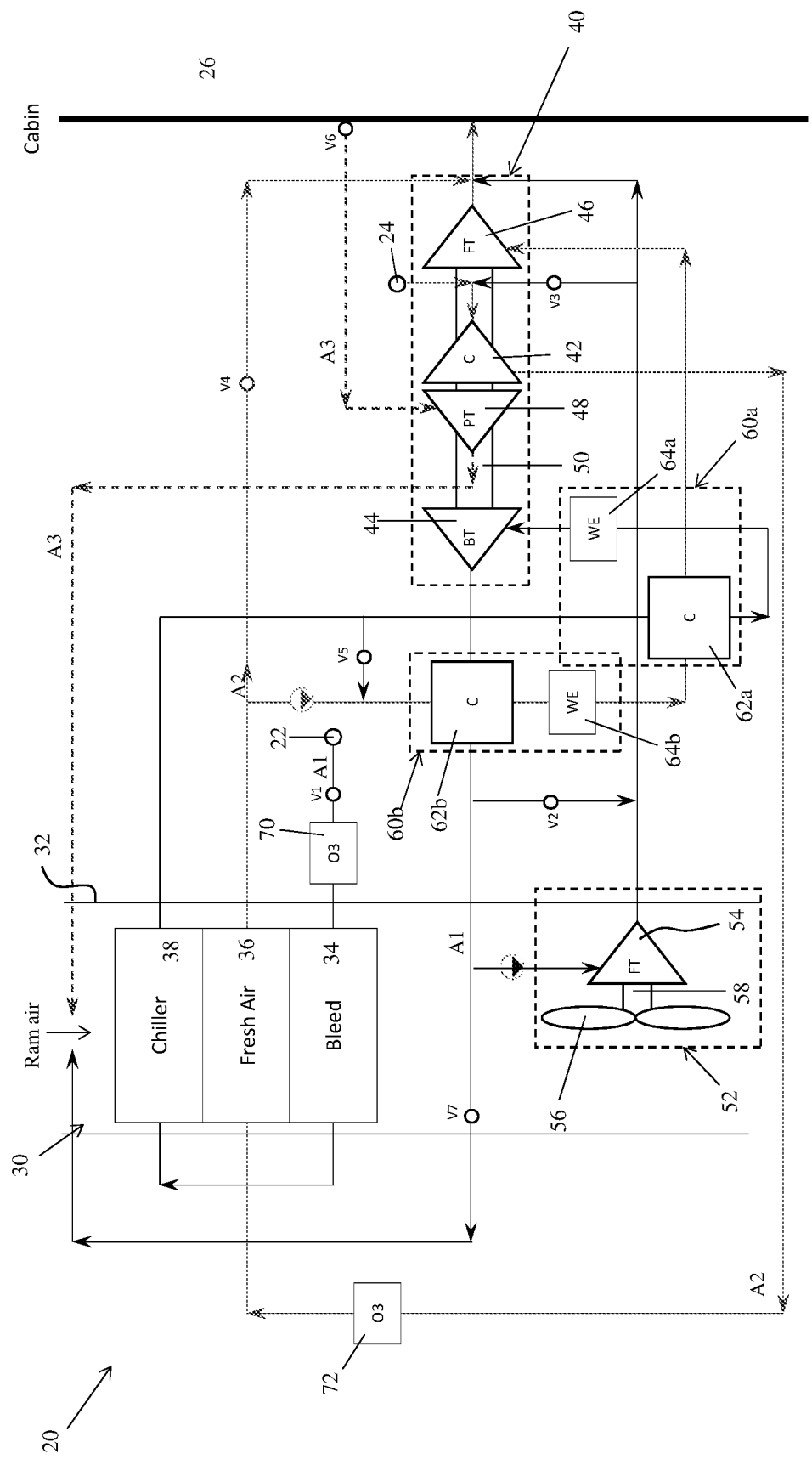
FIG. 2 is a simplified schematic diagram of a portion of an environmental control system according to another embodiment.
Figure 3:
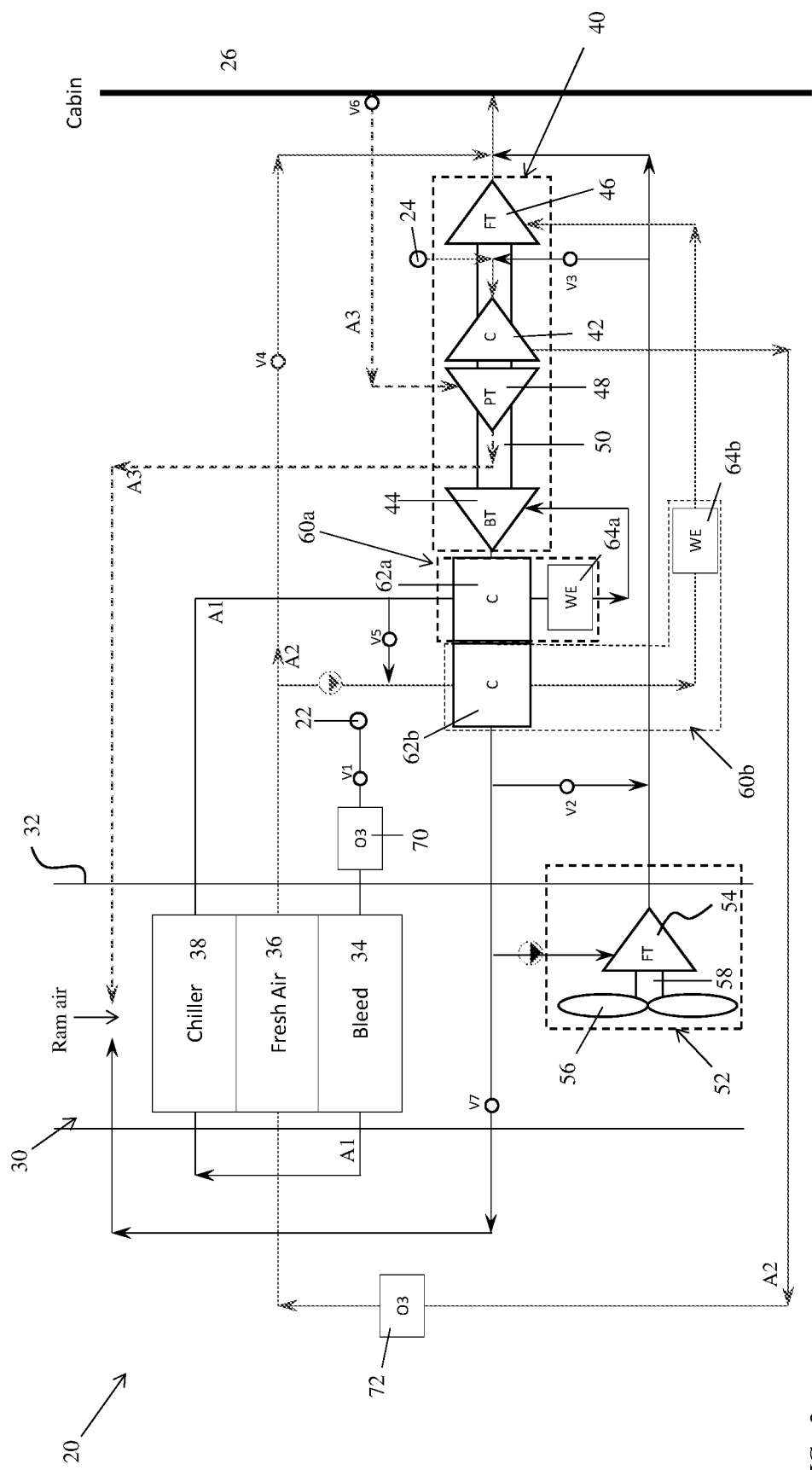
FIG. 3 is a simplified schematic diagram of a portion of an environmental control system according to another embodiment.
Figure 4:
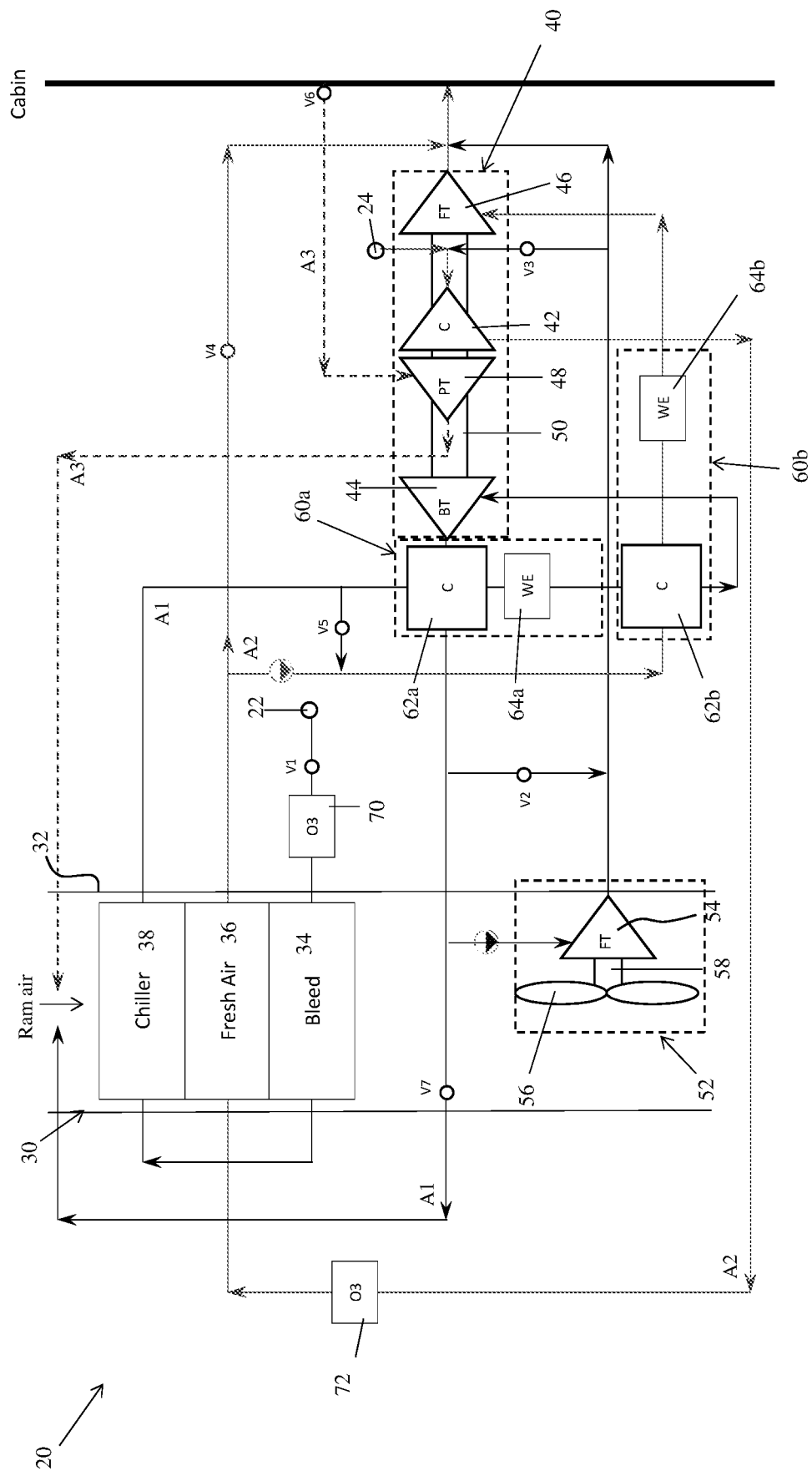
FIG. 4 is a simplified schematic diagram of a portion of an environmental control system according to another embodiment.

The system 20 additionally includes at least one dehumidification system 60. In the illustrated, non-limiting embodiment of FIG. 1, the dehumidification system 60 includes a condenser 62 arranged in fluid communication with both the first medium A1 and the second medium A2, and a water extractor or collector 64 associated with each of the first medium A1 and the second medium A2. The condenser 62 is a particular type of heat exchanger and the water collectors 64 are mechanical devices that perform a process of removing water from a medium. The configuration of the at least one dehumidification system 60 may vary. For example, in the embodiment illustrated in FIGS. 2-4, the system 20 includes a first dehumidification system 60a having a condenser 62a and a water extractor 64a located directly downstream from the condenser 62a. The system 20 additionally includes a second dehumidification system 60b having a condenser 62b and a water extractor 64b located directly downstream from the condenser 62b. Although the first dehumidification system 60a is arranged within the fluid flow path of the first medium A1 and the second dehumidification system 60b is arranged within the fluid flow path of the second medium A2, the condensers of both dehumidification systems provide an interface for the first and second mediums. As shown, various configurations of the one or more dehumidification systems 60 are considered within the scope of the disclosure.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system 20 can be regulated to a desired value. For instance, a first valve V1 is configured to control a supply of the first medium A1 to the system 20. A second valve V2 may be operable to allow a portion of a medium to bypass the expansion device 52, and a third valve V3 may be operable to control a flow of the first medium A1 to the inlet of the compressor 42. Operation of a fourth valve V4 allows a medium to selectively bypass the compression device 40 and a fifth valve V5 is configured to control a supply of a first medium A1 mixed with the second medium A2. Valve V6 may be configured to control a supply of the third medium A3 to the system 20, and the valve V7 is operable to control a flow of the first medium A1 provided to the ram air circuit 30.

The system 20 is operable in a plurality of modes, selectable based on a flight condition of the aircraft. In an embodiment, the system 20 is operable in a first mode when the aircraft is on the ground or at a low altitude. The system 20 may be operable in a second mode when the aircraft is on the ground, such as during hot humid days for example, or at low altitude. The system is operable in a third mode when the aircraft is in flight, such as high altitude cruise, climb, and/or descent, and is operable in a fourth mode when 100% fresh air is to be provided to the volume 26 for example.

The operation of the system 20 is described with respect to the embodiment of FIG. 1. However, it should be understood that variations in the flow path described may occur due to the several configurations of the dehumidification system 60. In the first mode, valve V6 for controlling a supply of the third medium A3 to the system 20 may, but need not be open. Accordingly, the supply of third medium A3 is not critical to operation of the system 20 in the first mode. In the first mode, each of valves V2, V5, and V7 is in a closed configuration. Further, valve V3 may be arranged in either an open or a closed configuration. Valve V1 is open and the first medium A1 drawn through the inlet port 22 may pass through an ozone converter, illustrated at 70, before being provided to the first heat exchanger 34. Within the first heat exchanger 34, the first medium A1 is cooled via a flow of ram air. The first medium A1 then passes from the first heat exchanger 34 to the third heat exchanger 38 within the series of ram heat exchangers where the moisture within the first medium A1 condenses. Moisture is removed from the wet first medium A1 within a water extractor 64 of the dehumidification system 60 before being provided to the inlet of the bleed air turbine 44. Within the turbine 44, the first medium A1 is expanded and work is extracted, to power operation of the compressor 42.

The first medium A1 output from the bleed air turbine 44 is provided to a condenser 62 where the first medium A1 is arranged in a heat exchange relationship with the second medium A2. Within the condenser 62, the cool first medium A1 is heated. The resulting warm first medium A1 is then provided to the turbine 54 of the expansion device 52. Within the turbine 54, the first medium A1 is expanded and work is extracted, thereby driving operation of the fan 56 which moves ram air through the ram air circuit 30. The first medium A1 output from the turbine 54 of the expansion device 52 may then be directed to one or more loads of the system 20. Accordingly, in the first mode of operation, the first medium A1 is provided through the bleed air turbine 44 of the compression device 40 and the bleed air turbine 54 of the expansion device in series.

Simultaneously, a supply of second medium A2 drawn from port 24 is compressed within the compressor 42 causing the temperature of the second medium A2 to increase. The second medium A2 output from the compressor 42 passes sequentially through an ozone converter 72 and the second heat exchanger 36 to cool the second medium A2 to about an ambient temperature. In embodiments where valve V4 is closed, the compressed second medium A2 output from the second heat exchanger 36 is provided to the condenser 62 and then to a water extractor 64 to condense and remove moisture therefrom. Moisture is removed from the second medium A2 when the second medium is at a temperature above freezing. In an embodiment, the temperature of the second medium is between about 40° C. and about 50° C. when the second medium A2 is provided to the condenser 62 and the water extractor 64.

The cool second medium A2 having a medium pressure is then provided to the fresh air turbine 46 of the compression device 40 where it is expanded and work is extracted, thereby driving operation of the compressor 42. The second medium A2 output from the turbine 46 of the compression device 40 is combined with the first medium A1 output from the turbine 54 of the expansion device 52 before being sent to one or more loads, including the volume 26.

The second mode of operation of the system of FIG. 1 is similar to the first mode; however, in the second mode of operation, valve V3 is open. As a result, at least a portion of the first medium A1 output from the bleed air turbine 54 of the expansion device 52 is mixed with the second medium A2 upstream from the inlet of the compressor 42. Mixing the first medium A1 output from the bleed air turbine 54 of the expansion device 52 with the second medium A2 upstream from the compressor 42 lowers the temperature of the air at the compressor inlet, thereby allowing the compressor 42 to achieve a higher discharge pressure. Further, mixing the first medium A1 output from the bleed air turbine 54 of the expansion device 52 with the second medium A2 upstream from the compressor 42 lowers the humidity of the second medium A2, thereby reducing the heat load of the system 20.

In the third mode of operation, the first medium A1 is drawn through the inlet port 22 and passes through the ozone converter 70 before being provided to the first heat exchanger 34. From the first heat exchanger 34, the first medium A1 is provided to the third heat exchanger 38 where the moisture within the first medium A1 condenses. Moisture is removed from the wet first medium A1 within the water extractor 64 before being provided to the inlet of the bleed air turbine 44 of the compressing device 40. Within the turbine 44, the first medium A1 is expanded and work is extracted, to power operation of the compressor 42. From the turbine 44, the first medium A1 is provided to the condenser 62. In the third mode of operation, valve V2 is open. As a result, the first medium A1 output from the condenser 62 flows through the conduit including valve V2, thereby bypassing the expansion device 52. Accordingly, the first medium A1 output from the condenser 62 is directed to one or more loads of the system 20. In such embodiments, because no medium is provided to the expansion device 52 when the valve V2 is open, the expansion device 52 is non-operational in the third mode. However, because the system 20 is typically in the third mode when the aircraft is in flight (at altitude), the forward movement of the aircraft is sufficient to draw ram air through the ram air circuit 30 without the use of the fan 56.

Simultaneously, the second medium A2 is compressed within the compressor 42 causing the temperature of the second medium A2 to increase. The second medium A2 output from the compressor 42 passes sequentially through the ozone converter 72 and the second heat exchanger 36 to cool the second medium A2 to about an ambient temperature. The compressed second medium A2 output from the second heat exchanger 36 is provided to the condenser 62 and then to a water extractor 64 to condense and remove moisture therefrom. The cool second medium A2 having a medium pressure is then provided to the fresh air turbine 46 of the compression device 40 where it is expanded and work is extracted, thereby driving operation of the compressor 42. The second medium A2 output from the turbine 46 of the compression device 40 is combined with the first medium A1 output from the turbine 54 of the expansion device 52 before being sent to one or more loads, including the volume 26.

In the third mode of operation of the system 20, valve V6 is open to provide the third medium A3 to the system 20. The third medium A3 is supplied to the power turbine 48 of the compression device 40. Within the turbine 48, the third medium A3 is expanded and work is extracted, to provide additional energy for operation of the compressor 42. The third medium A3 output from the power turbine 48 may be provided to a downstream portion of the system 20. In an embodiment, the third medium A3 is directed to an inlet of the ram air circuit 30, where it is combined with the ram air before flowing across the ram air heat exchangers 34, 36, 38.

In a fourth mode of operation, referred to as a "100% Fresh Air" mode, only the second medium A2 is provided to the volume 26 or other loads. In the fourth mode, valve V2 is closed and valve V7 is open. As a result, the first medium A1 output from the bleed air turbine 44 of the compression device 40 passes through the compressor before being directed to a downstream portion of the system 20. When valve V7 is open, the first medium A1 is not provided to the expansion device 52. Rather, the first medium A1 is directed to an inlet of the ram air circuit 30, where it is combined with the ram air before flowing across the ram air heat exchangers 34, 36, 38.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure.

What is claimed is:

1. An environmental control system of an aircraft comprising:
   a ram air circuit including a ram air shell having at least one heat exchanger positioned therein;
   at least one dehumidification system arranged in fluid communication with the ram air circuit;
   a compressing device arranged in fluid communication with the ram air circuit and the dehumidification system, the compressing device including a compressor and at least one turbine coupled via a first shaft, the at least one turbine including a first turbine and a second turbine; and
   an expansion device separate from the compressing device and arranged in fluid communication with the ram air circuit and the at least one dehumidification system, the expansion device having another turbine mounted to a second shaft, the second shaft being offset from the first shaft, the environmental control system receiving a flow of a first medium and a flow of a second medium;
   wherein the environmental control system is operable in a plurality of modes and in a first mode, a flow of the first medium is provided to the first turbine of the compressing device and the another turbine of the expansion device in series and a flow of the second medium is provided to the second turbine of the compressing device, and in a second mode, the flow of first medium bypasses the another turbine.

2. The environmental control system of claim 1, wherein the environmental control system is operable in the first mode when the aircraft is on the ground.

3. The environmental control system of claim 1, wherein in a second third mode, the flow of the first medium output from the expansion device is provided to a compressor of compressing device.

4. The environmental control system of claim 1, wherein the environmental control system is operable in the third second mode when the aircraft is in flight.

5. The environmental control system of claim 1, wherein in a fourth mode, the flow of the first medium bypasses the expansion device and is released into the ram air circuit.

6. The environmental control system of claim 5, wherein when the environmental control system is in the fourth mode, only the second medium is provided to a volume of the aircraft.

7. The environmental control system of claim 1, wherein the expansion device includes the another turbine and a fan operably coupled by the second shaft.

8. The environmental control system of claim 1, wherein the expansion device is operable to draw ram air through the ram air circuit.

9. The environmental control system of claim 1, wherein the compression device further includes:
a compressor configured to receive energy from the first medium being expanded across the turbine, the compressor being configured to compress the second medium, the at least one turbine is configured to provide energy to drive the compressor by expanding a first medium.

10. The environmental control system of claim 9, wherein the first medium is bleed air.

11. The environmental control system of claim 10, wherein the bleed air is drawn from at least one of an engine and an auxiliary power unit.

12. The environmental control system of claim 9, wherein the second medium is fresh air.

13. The environmental control system of claim 10, wherein the at least one turbine of the compression device further includes a power turbine configured to provide energy to the compressor by expanding a third medium.

* * * * *